United States Patent
Girolamo et al.

(10) Patent No.: US 11,306,697 B2
(45) Date of Patent: Apr. 19, 2022

(54) SPAR CAP FOR A WIND TURBINE BLADE OF A WIND TURBINE, WIND TURBINE BLADE, WIND TURBINE AND METHOD FOR MANUFACTURING A SPAR CAP FOR A WIND TURBINE BLADE OF A WIND TURBINE

(71) Applicant: Siemens Gamesa Renewable Energy A/S, Brande (DK)

(72) Inventors: Donato Girolamo, Voorhout (NL); Poul-Erik Hassing, Storvorde (DK); Jens Kjaer Nielsen, Aalborg (DK)

(73) Assignee: SIEMENS GAMESA RENEWABLE ENERGY A/S

( * ) Notice: Subject to any disclaimer, the term of this patent is extended or adjusted under 35 U.S.C. 154(b) by 0 days.

(21) Appl. No.: 16/834,314

(22) Filed: Mar. 30, 2020

(65) Prior Publication Data
US 2020/0318604 A1    Oct. 8, 2020

(30) Foreign Application Priority Data

Apr. 3, 2019   (EP) .................................... 19167119

(51) Int. Cl.
*F03D 1/06* (2006.01)
*F03D 80/00* (2016.01)

(52) U.S. Cl.
CPC ............ *F03D 1/0675* (2013.01); *F03D 80/00* (2016.05); *Y02E 10/72* (2013.01)

(58) Field of Classification Search
CPC ........ F03D 1/0675; F03D 13/10; F03D 80/00; Y02E 10/72
See application file for complete search history.

(56) References Cited

U.S. PATENT DOCUMENTS

| 10,987,879 B2 * | 4/2021 | Johnson | ................ B29C 70/342 |
| 2017/0218918 A1 * | 8/2017 | Cieslak | .................. B29C 70/42 |
| 2018/0252202 A1 | 9/2018 | Johnson et al. | |

(Continued)

FOREIGN PATENT DOCUMENTS

| CN | 108979951 A | 12/2018 |
| EP | 3 068 613 B1 | 9/2016 |
| EP | 3068613 B1 | 1/2018 |

(Continued)

OTHER PUBLICATIONS

European Search Report and Written Opinion of the European Searching Authority dated Sep. 12, 2019 for Application No. 19167119.7.

*Primary Examiner* — Ryan J. Walters
(74) *Attorney, Agent, or Firm* — Schmeiser, Olsen & Watts LLP

(57) ABSTRACT

Provided is a spar cap for a wind turbine blade of a wind turbine, the spar cap including at least two stacks arranged in a longitudinal direction of the spar cap, wherein the at least two stacks are arranged adjacent to one another in a width direction of the spar cap and each of the at least two stacks) includes multiple elongate beams stacked on top of one another in a height direction of the spar cap, the height direction being transverse to the longitudinal direction and the width direction. Also provided is a wind turbine blade of a wind turbine, a wind turbine and method for manufacturing a spar cap for a wind turbine blade of a wind turbine.

15 Claims, 5 Drawing Sheets

(56) References Cited

U.S. PATENT DOCUMENTS

2019/0211806 A1\* 7/2019 Girolamo ........... B29D 99/0025
2020/0318607 A1\* 10/2020 Burchardt ............. B29C 66/721

FOREIGN PATENT DOCUMENTS

| EP | 3501808 A1 | 6/2019 |
| WO | WO 2013087078 A1 | 6/2013 |
| WO | WO 2016015736 A1 | 2/2016 |
| WO | WO 2018091054 A1 | 5/2018 |

\* cited by examiner

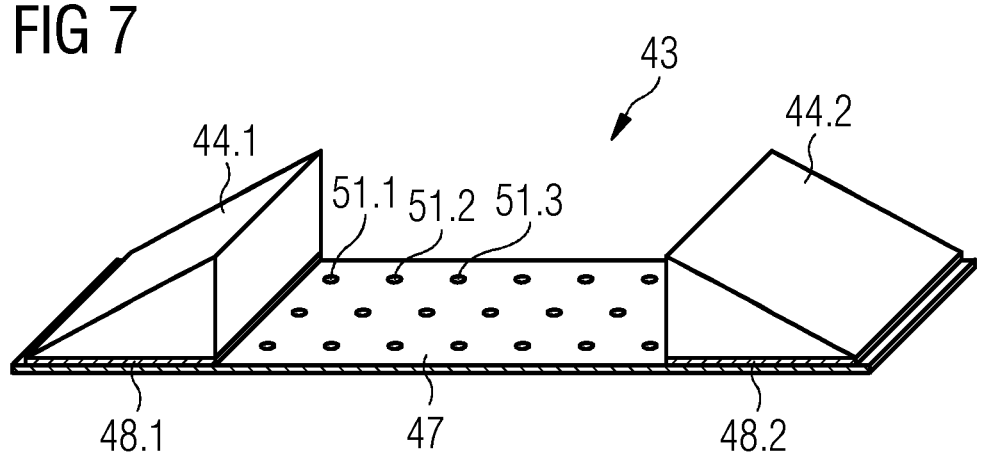
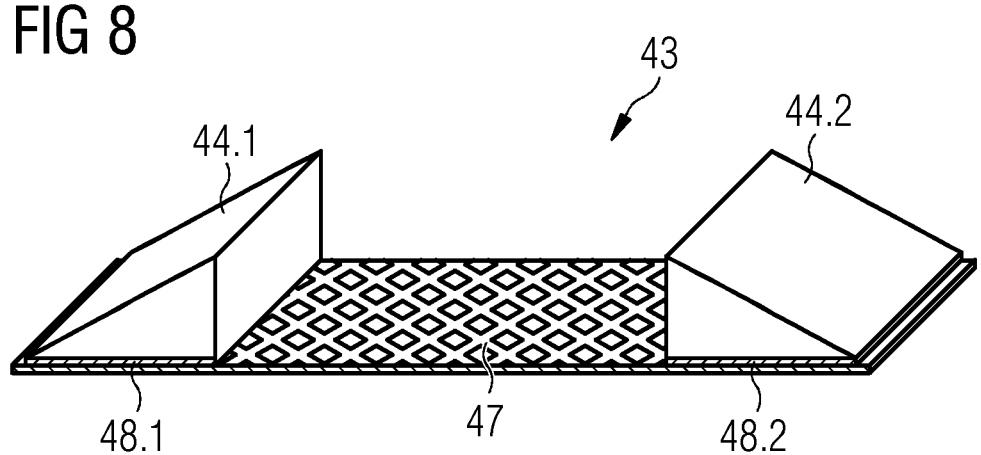

SPAR CAP FOR A WIND TURBINE BLADE OF A WIND TURBINE, WIND TURBINE BLADE, WIND TURBINE AND METHOD FOR MANUFACTURING A SPAR CAP FOR A WIND TURBINE BLADE OF A WIND TURBINE

CROSS-REFERENCE TO RELATED APPLICATIONS

This application claims priority to European Application No. 19167119.7, having a filing date of Apr. 3, 2019, the entire contents of which are hereby incorporated by reference.

FIELD OF TECHNOLOGY

The following is directed to a spar cap for a wind turbine blade of a wind turbine, the spar cap comprising at least two stacks arranged in a longitudinal direction of the spar cap, wherein the at least two stacks are arranged adjacent to one another in a width direction of the spar cap and each of the at least two stacks comprises multiple elongate beams stacked on top of one another in a height direction of the spar cap, the height direction being transverse to the longitudinal direction and the width direction. Moreover, the following is directed to a wind turbine blade, a wind turbine.

BACKGROUND

Typically, a spar in the wind turbine blade comprises two spar caps and a spar web connecting the spar caps. The spar caps consist of multiple elongate beams, which generally are elongate structures having high tensile strength. The elongate beams may alternatively be referred to as strips, bands, laminate structures, profiles or bars, for example. Such beams are stacked on top of one another to further increase the tensile strength and make the spar cap flexible against torsional load. For this purpose, it is common to not only stack such beams but also arrange multiple stacks consisting of the stacked beams next to each other in the spar caps. Thus, such a spar cap consists or comprises of multiple elongate beams arranged on top of one another and adjacent to each other. Thereby, it is easier to drape beams of limited width along the wind turbine blade. Moreover, thereby, it is possible to reduce a gap between the beams and shells of the wind turbine blade. Further, the spar cap becomes very flexible and can be twisted to a high degree without failure. This is particularly important for the operation of the wind turbine considering the high flapwise and edgewise loads that act upon the wind turbine blades of the wind turbine. However, it has been found that alignment of the beams can be very difficult. This is in particular because the spar caps are not flat but designed with a curvature corresponding to the curvature of the wind turbine blade at the position at which the spar cap is being arranged. When aligning the beams relative to one another in the shape of a curvature, gaps are forming between adjacent elongate beams at the so-called butt-joints. These gaps are weak points in the design of the spar caps and are critical to the quality of the wind turbine blades. Moreover, due to the gaps, it is possible that the size accuracy of the spar cap manufactured at a later stage cannot be met. EP 3 068 613 B1 relates to an elongate spar structure for a wind turbine blade, wherein the spar structure comprises a stack of strips of fiber-reinforced polymeric material. The strips are strapped together with straps made of a fibrous material and the straps are integrated with the stack by cured resin. Thereby, gaps in between the laminate layup are filled by means of the resin. However, if these stacks where to be arranged adjacent to one another, gaps would form in between the adjacent stacks, thereby weakening the elongate spar structure.

SUMMARY

An aspect relates to eliminate, control or at least reduce the previously described disadvantages. In particular it is an aspect of embodiments of the invention to provide a spar cap for a wind turbine blade of a wind turbine, a wind turbine blade of a wind turbine, a wind turbine and a method for manufacturing a spar cap for a wind turbine blade of a wind turbine, which enable in a cost effective and easy way that gaps between adjacent stacks of spar caps are eliminated or reduced.

Thereby, the features and details described in connection with the spar cap of embodiments of the invention apply in connection with the wind turbine blade of embodiments of the invention, the wind turbine of embodiments of the invention and the method for manufacturing a spar cap for a wind turbine blade of a wind turbine, so that regarding the disclosure of the individual aspects of embodiments of the invention it is or can be referred to one another.

According to a first aspect of embodiments of the invention, there is a spar cap for a wind turbine blade of a wind turbine, the spar cap comprising at least two stacks arranged in a longitudinal direction of the spar cap, wherein the at least two stacks are arranged adjacent to one another in a width direction of the spar cap and each of the at least two stacks comprises multiple elongate beams stacked on top of one another in a height direction of the spar cap, the height direction being transverse to the longitudinal direction and the width direction, whereby the spar cap further comprises a gap limiter comprising a first wedge element, a second wedge element and a limit strip, wherein the first wedge element is arranged adjacent to a first outer stack and the second wedge element is arranged adjacent to a second outer stack, wherein the first outer stack and the second outer stack are of the at least two stacks and located opposite to one another in the width direction, and wherein the first wedge element is connected to the second wedge element by means of the limit strip.

According to embodiments of the invention, a distance between the first wedge element and the second wedge element is kept at a maximum distance by means of the limit strip, so that gaps between adjacent stacks are eliminated or reduced and controlled, when placing the stacks in between the wedge elements.

The multiple elongate beams may comprise or be made from carbon fiber-reinforced plastic, wherein an interlayer material, a carbon fiber fabric, can be arranged in between the stacked multiple elongate beams. The multiple elongate beams may be pultruded elements. The elongate beams may alternatively be referred to as strips, bands, laminate structures, profiles or bars, for example. The distance between the first wedge element and the second element may be exactly or substantially a sum of the widths of all adjacent stacks, wherein substantially means that the distance may be 98% to 102%, in particular 99% to 101% of the sum of the widths of all adjacent stacks.

At least one of the first wedge element and the second wedge element may be made from balsa. The wedge elements may comprise a substantially triangular or trapezoidal cross-sectional area.

In an embodiment of the invention, at least one of the limit strip and the first wedge element and the second wedge element are preloaded by means of the at least two stacks, so that the first wedge element and the second wedge element are forced towards one another.

The maximum distance between the first wedge element and the second element may be exactly or substantially a sum of the widths of all adjacent stacks, wherein substantially means that the maximum distance may be 80% to 105%, in particular 90% to 103% and moreover in particular 95% to 100% of the sum of the widths of all adjacent stacks. Thereby, the first wedge element and the second wedge element, when the stacks are positioned in between them, may preload the limit strip, so that the adjacent stacks are forced towards one another from opposite sides in the width direction and gaps formed in between the adjacent stacks are eliminated.

The limit strip may be made from a stretchable material. Thereby, the stacks can be placed adjacent to one another in between the wedge elements easily by stretching the material for this purpose but when releasing the force by which the limit strip is stretched, the wedges push the adjacent stacks towards one another by means of a restoring force, whereby it is ensured that no or only minimal gaps are formed. The limit strip may also be made from a non-stretchable material.

The limit strip may have a limit strip width, wherein the limit strip width is greater than a sum of all stack widths of the adjacent at least two stacks. In particular, the limit strip width may be in the range of 80% to 120% of a sum of all stack widths of the adjacent multiple stacks and all wedge element widths of the opposite wedge elements. Thereby, it can be ensured that a stable connection between the wedge elements is provided.

In a preferred embodiment of the invention, the first wedge element and the second wedge element are arranged opposite to each other in the width direction. Thereby, the wedge elements push the adjacent stacks towards one another from opposing sides and thus the gaps are closed very effectively.

In a further preferred embodiment of the invention, the limit strip is connected to at least one of a bottom side of the first wedge element and a bottom side of the second wedge element. In particular, the limit strip may be connected to at least 30%, at least 50% or at least 80% of a surface of a bottom side of at least one of the first wedge element and a surface of a bottom side of the second wedge element. Further, the limit strip may be at least one of wrapped around the first wedge element and wrapped around the second wedge element. Thereby, a particularly safe connection is provided between the wedge elements and the limit strip, wherein the transmission of the force from the limit strip to the wedge elements is enhanced.

In yet another preferred embodiment of the invention, the limit strip is connected to at least one of the first wedge element and the second wedge element by means of an adhesive. Thereby, a cost-efficient and stable connection is ensured.

In yet a further preferred embodiment of the invention, the limit strip is at least one of a precasted layer material and a flexible layer material. Thereby, a maximum width of the sum of the widths of the stacks arranged between the first wedge element and second wedge element is ensured by means of a high stiffness of the material. Further, this allows for the limit strip to easily follow a curvature of the spar cap and thus manufacture spar caps with high degree of curvature.

In a moreover preferred embodiment of the invention, the limit strip comprises or is made from a glass layer material, in particular at least one of a glass-fiber biax fabric and at least a glass-fiber mesh fabric, which may comprise at least one glass-fiber roving.

In a further preferred embodiment of the invention, the limit strip comprises multiple tunnels, which can be flowed through by a resin. Thereby, it can be ensured that the limit strip has no negative effect on a casting of the spar cap.

In a moreover preferred embodiment of the invention, at least one longitudinal cut is arranged in at least one of the first wedge element and the second wedge element in or substantially in the longitudinal direction. The number of longitudinal cuts in a wedge element may be in the range of 2 to 20, in particular 2 to 10 and moreover in particular 3 to 7, for example. At least one of the at least one longitudinal cut and all longitudinal cuts may have a height of 30% to 100%, in particular 50% to 95% and more particular 70% to 90% of the wedge element height at the location of the longitudinal cut. Thereby, the wedge elements are provided with some flexibility, so that the stacks can be placed between the first wedge element and the second wedge element with ease and the wedge elements may easily follow a curvature of the spar cap.

In a further preferred embodiment of the invention, at least one of the at least one longitudinal cut is a groove, the groove having a U-shape or V-shape. Thereby, the flexibility of the wedge element is enhanced.

In another preferred embodiment of the invention, the spar cap comprises at least two gap limiters, which are arranged at a distance from one another. Multiple gap limiters, for example 3 to 20 gap limiters, may be arranged along the length of the spar cap. Thereby, gaps along the entire spar cap are efficiently closed.

According to a second aspect of embodiments of the invention, there is a wind turbine blade comprising a shell and a spar, the spar having at least one spar cap according to embodiments of the invention. The wind turbine blade according to the second aspect of embodiments of the invention has the same advantages than the spar cap for a wind turbine blade of a wind turbine according to the first aspect of embodiments of the invention.

According to a third aspect of embodiments of the invention, there is a wind turbine comprising at least one wind turbine blade according to embodiments of the invention. The wind turbine according to the third aspect of embodiments of the invention has the same advantages than the spar cap for a wind turbine blade of a wind turbine according to the first aspect of embodiments of the invention.

According to a fourth aspect of embodiments of the invention, there is a method for manufacturing a spar cap for a wind turbine blade of a wind turbine, the spar cap comprising at least two stacks arranged in a longitudinal direction of the spar cap, wherein the at least two stacks are arranged adjacent to one another in a width direction of the spar cap and each of the at least two stacks comprises multiple elongate beams stacked on top of one another in a height direction of the spar cap, the height direction being transverse to the longitudinal direction and the width direction, the spar cap further comprising a gap limiter comprising a first wedge element, a second wedge element and a limit strip, the method comprising the steps of:

(a) arranging the limit strip on a spar cap mold, the spar cap mold having a curvature,
(b) connecting the first wedge element and the second wedge element to the limit strip, and (c) arranging the at least two stacks on the limit strip and in between the first wedge element and the second wedge element, so that the first wedge element is arranged adjacent to a first outer stack and the second wedge element is arranged adjacent to a second outer stack, wherein the first outer stack and the second outer stack are of the at least two stacks and are located opposite to one another in the width direction.

Moreover, prior to arranging the limit strip on the spar cap mold, reinforcing material such as glass fiber fabrics may be placed on the spar cap mold.

Further, after arranging the at least two stacks on the limit strip and in between the first wedge element and the second wedge element, so that the first wedge element is arranged adjacent to a first outer stack and the second wedge element is arranged adjacent to a second outer stack, wherein the first outer stack and the second outer stack are of the at least two stacks and are located opposite to one another in the width direction, at least one or all of the following further steps may follow:
(a) filling gaps between the wedge elements of the gap limiters with wedge elements having in particular the same or substantially the same shape of the wedge elements of the gap limiters,
(b) overlaying the thereby filled structure with reinforcing layers (e.g., glass fiber fabrics), and
(c) applying vacuum via vacuum bags, injecting resin and curing the structure so as to manufacture the spar cap.

Alternatively, the wedge elements and limit strips may be prefabricated and placed in the spar cap mold. Thereafter, the beams may be placed on top of the gap limiter.

The method comprises the further step that the spar cap is casted on top of the spar cap mold.

The method according to the fourth aspect of embodiments of the invention has the same advantages than the spar cap for a wind turbine blade of a wind turbine according to the first aspect of embodiments of the invention, the wind turbine blade of a wind turbine according to the second aspect of embodiments of the invention and the wind turbine according to the third aspect of embodiments of the invention.

BRIEF DESCRIPTION

Some of the embodiments will be described in detail, with references to the following Figures, wherein like designations denote like members, wherein:

FIG. 7 shows a front perspective view on a first example of a gap limiter of the spar cap of FIGS. 5 and 6; and FIG. 8 shows a front perspective view on a second example of a gap limiter of the spar cap of FIGS. 5 and 6.

DETAILED DESCRIPTION

Same objects in FIGS. 1 to 8 are denominated with the same reference number. If there is more than one object of the same kind in one of the figures, the objects are numbered in ascending order with the ascending number of the object being separated from its reference number by a dot. The specific dimensions of features and parts in the figures are exemplary and may be enlarged for ease of reference only.

Figure 1:
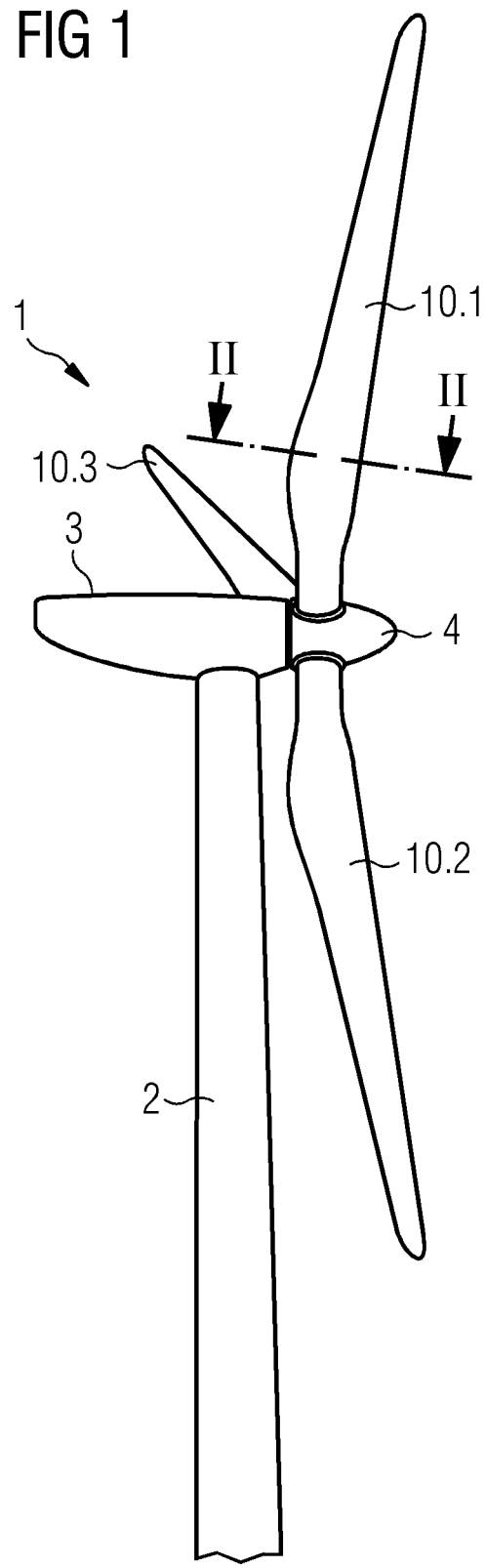
FIG. 1 shows a side view on a wind turbine.

FIG. 1 is a side view on an embodiment of a wind turbine 1 according to embodiments of the invention. The wind turbine 1 is provided with three wind turbine blades 10.1, 10.2, 10.3 attached to a hub 4 of the wind turbine 1, which is connected to a nacelle 3 of the wind turbine 1, the nacelle 3 being supported on a mast 2 of the wind turbine 1.

Figure 2:
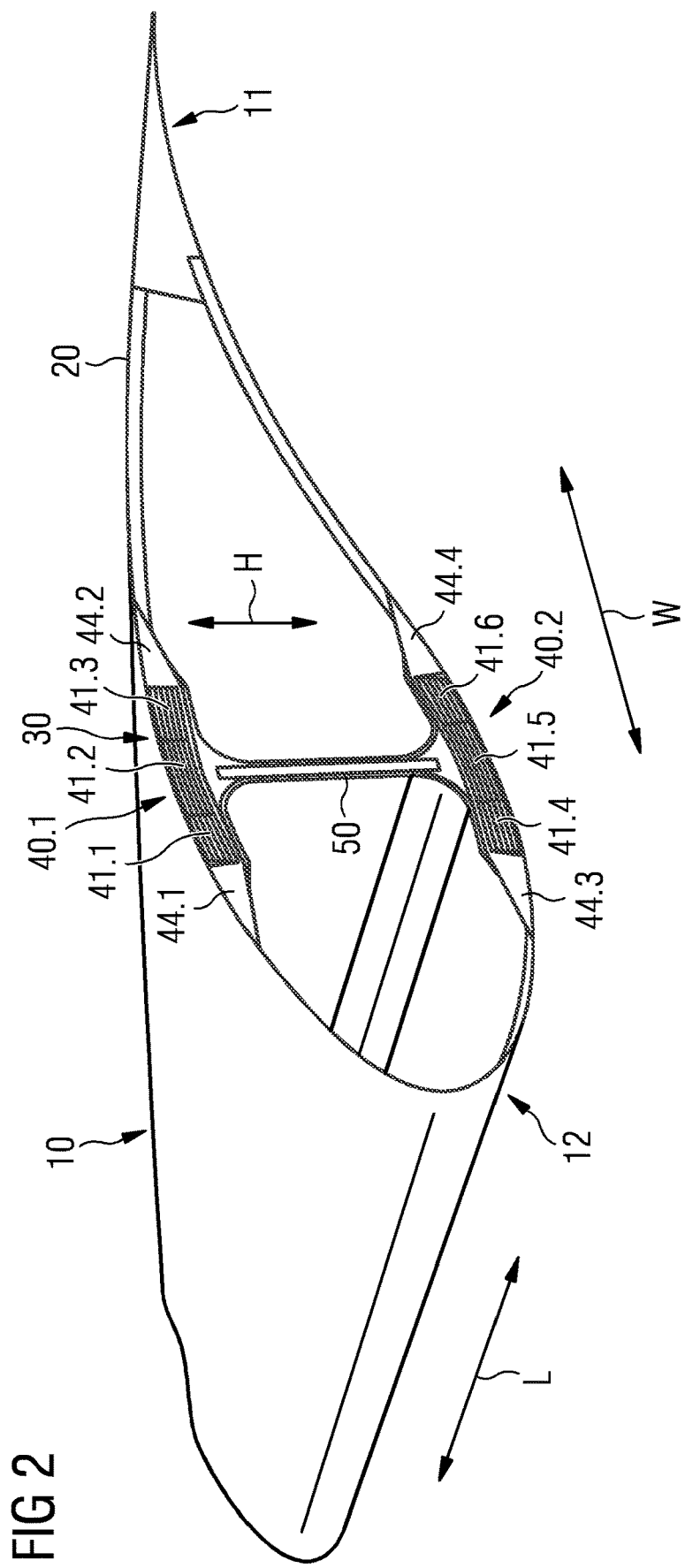
FIG. 2 shows a side perspective view on a sectional cut along a transversal plane of a wind turbine blade of the wind turbine of FIG. 1.

FIG. 2 is a side sectional view along the transversal plane of line X-X depicted in FIG. 1 of the wind turbine blade 10.1 of the wind turbine 1 of FIG. 1. The wind turbine blade 10 has a longitudinal extension in a longitudinal direction L, a width extension in a width direction W and a height extension in a height direction H. The wind turbine blade 10 further has a trailing edge 11 and a leading edge 12. The wind turbine blade 10 comprises a shell 20 and a spar 30. The spar 30 comprises two spar caps 40.1, 40.2. The two spar caps 40.1, 40.2 face each other and are connected to one another by means of a spar web 35, in this particular embodiment. However, other arrangements of the spar 30, such as an H-beam or X-beam type spar 30 are possible. In this particular embodiment, the spar cap 40.1 comprises three adjacent stacks 41.1, 41.2, 41.3 comprising multiple elongate beams 42 stacked on top of one another in the height direction H, wherein a first wedge element 44.1 is arranged adjacent to a first outer stack 41.1 of the stacks 41.1, 41.2, 41.3 and a second wedge element 44.2 is arranged adjacent to a second outer stack 41.3 of the stacks 41.1, 41.2, 41.3, wherein the first outer stack 41.1 and the second outer stack 41.3 are located opposite to one another in the width direction W. The spar cap 40.2 comprises three adjacent stacks 41.4, 41.5, 41.6 comprising multiple elongate beams 42 stacked on top of one another in the height direction H and a first wedge element 44.3 and second wedge element 44.4 having the same arrangement with respect to one another and the stacks 41.4, 41.5, 41.6 as the first wedge element 44.1 and the second wedge element 41.2.

Figure 3:
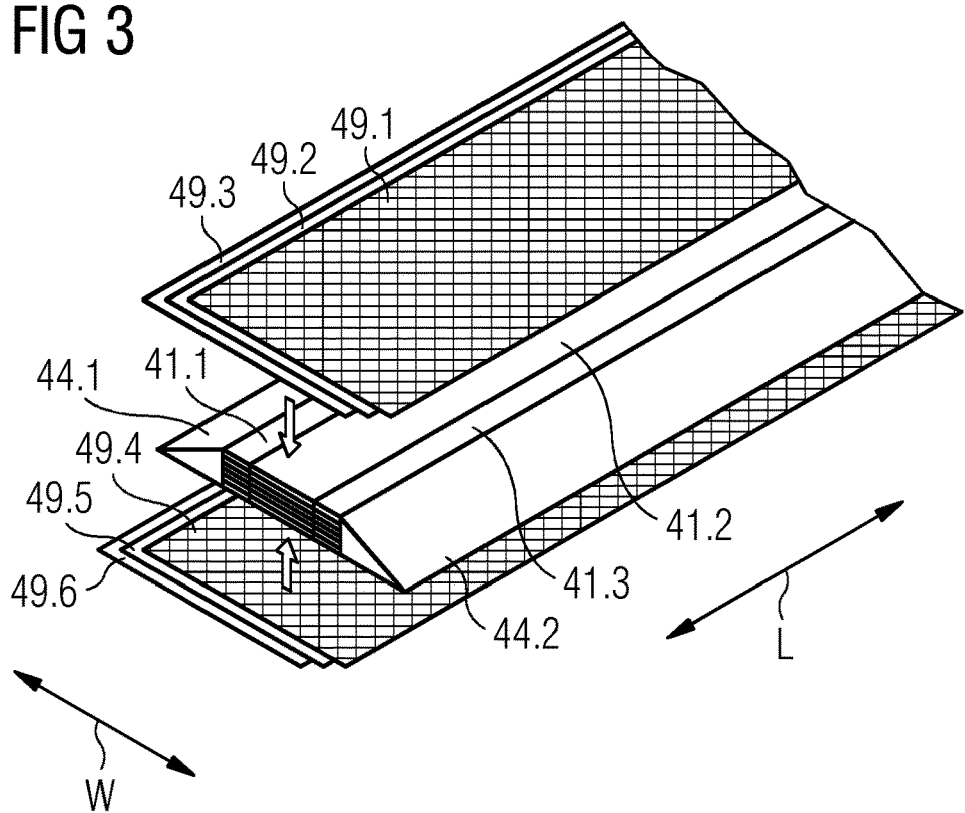
FIG. 3 shows an exploded side perspective view on components of a spar cap of the wind turbine blade of FIG. 2.

FIG. 3 is an exploded side perspective view on components of the spar cap 40.1 of the wind turbine blade 10 of FIG. 2. The stacks 41.1, 41.2, 41.3 and wedge elements 44.1, 44.2 have the arrangement as previously described with reference to FIG. 2. Cover mats 49.1, 49.2, 49.3 are attached to top sides of the stacks 41.1, 41.2, 41.3 and the wedge elements 44.1, 44.2. Further cover mats 49.4, 49.5, 49.6 are attached to bottom sides of the stacks 41.1, 41.2, 41.3 and the wedge elements 44.1, 44.2. The cover mats 49.1, 49.2, 49.3, 49.4, 49.5, 49.6 may be made from glass, for example.

Figure 4:
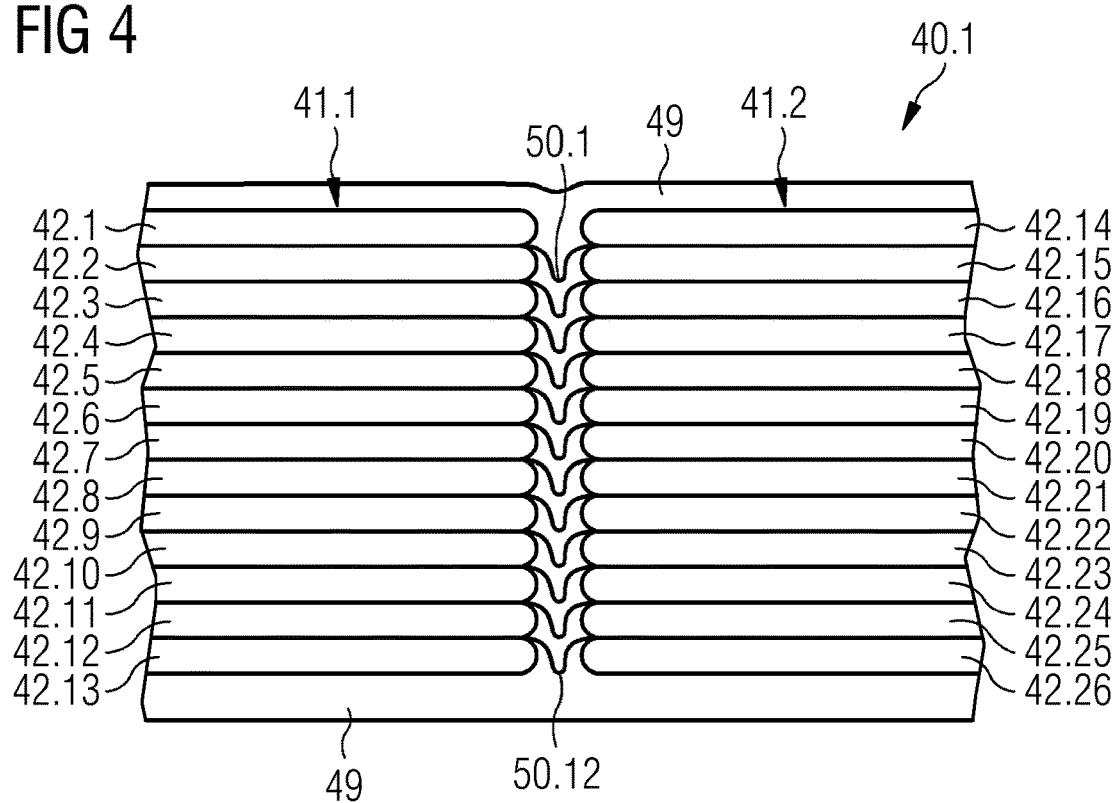
FIG. 4 shows a front sectional view on components of the spar cap of the wind turbine blade of FIG. 2.

FIG. 4 is a front sectional view on the stacks 41.1, 41.2 of the spar cap 40.1 of the wind turbine blade 10 of FIG. 2. Stack 41.1 is provided with thirteen beams 42.1, 42.2, 42.3, 42.4 . . . 42.13 stacked on top of one another. Stack 41.2 is provided with thirteen further beams 42.14, 42.15, 42.16, 42.17 . . . 42.26 stacked on top of one another. The cover mats 49 are arranged on a top side and a bottom side of the spar cap 40.1. An interlayer material 50.1 . . . 50.12 is arranged in between the stacked beams 42. As can be seen, there is a gap formed between adjacent stacks 41.1, 41.2, wherein the interlayer material 50.1 . . . 50.12 is wrinkled.

Figure 5:
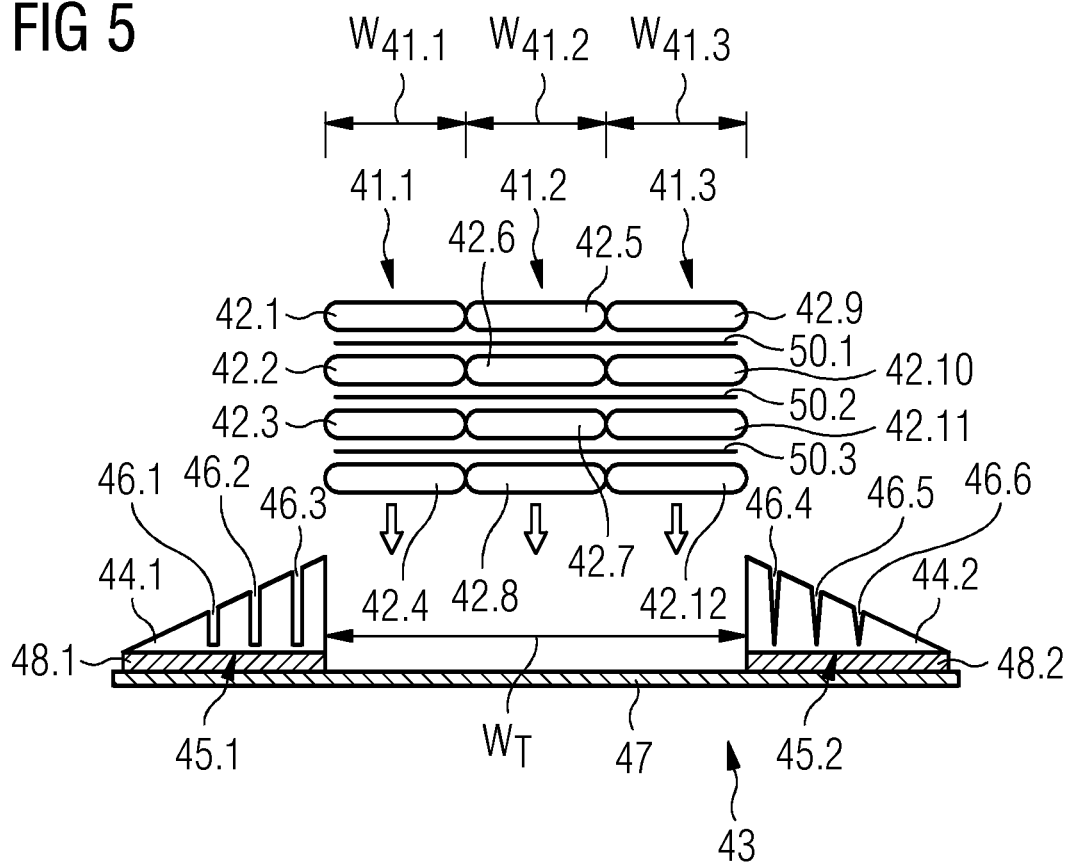
FIG. 5 shows an exploded front view on a spar cap according to an embodiment of the invention.

FIG. 5 is an exploded front view on a spar cap 40 according to an embodiment of the invention. The spar cap 40 comprises three adjacent stacks 41.1, 41.2, 41.3 having a width $W_{41.1}$, $W_{41.2}$, $W_{41.3}$. Each stack 41.1, 41.2, 41.3 comprises four of twelve beams 42.1 . . . 42.12 of the spar cap 40. In between the stacked beams 42, interlayer materials 50.1, 50.2, 50.3 are arranged. The stacks 41.1, 41.2, 41.3 are placed in between a limiter 43. The gap limiter comprises a first wedge element 44.1 and a second wedge element 44.2, wherein the first wedge element 44.1 and the second wedge element 44.2 are connected to one another by means of a limit strip 47. The limit strip 47 is attached to a bottom side 45.1 of the first wedge element 44.1 by means of an adhesive 48.1 and the limit strip 47 is attached to a bottom side 45.2 of the second wedge element 44.2 by means of an adhesive 48.2. The first wedge element 44.1 is provided with three longitudinal cuts 46.1, 46.2, 46.3 being provided as U-shaped grooves. The second wedge element 44.2 is provided with three longitudinal cuts 46.4, 46.5, 46.6 being provided as V-shaped grooves. The wedge elements 44.1, 44.2 are separated from each other by a distance $W_T$, which corresponds to the sum of the widths $W_{41.1}$, $W_{41.2}$, $W_{41.3}$ of the stack 41.1, 41.2, 41.3 in this particular embodiment. Thereby, gaps between adjacent stacks 41.1, 41.2, 41.3 and wrinkles of the interlayer materials 50.1, 50.2, 50.3 are effectively eliminated or at least reduced.

Figure 6:
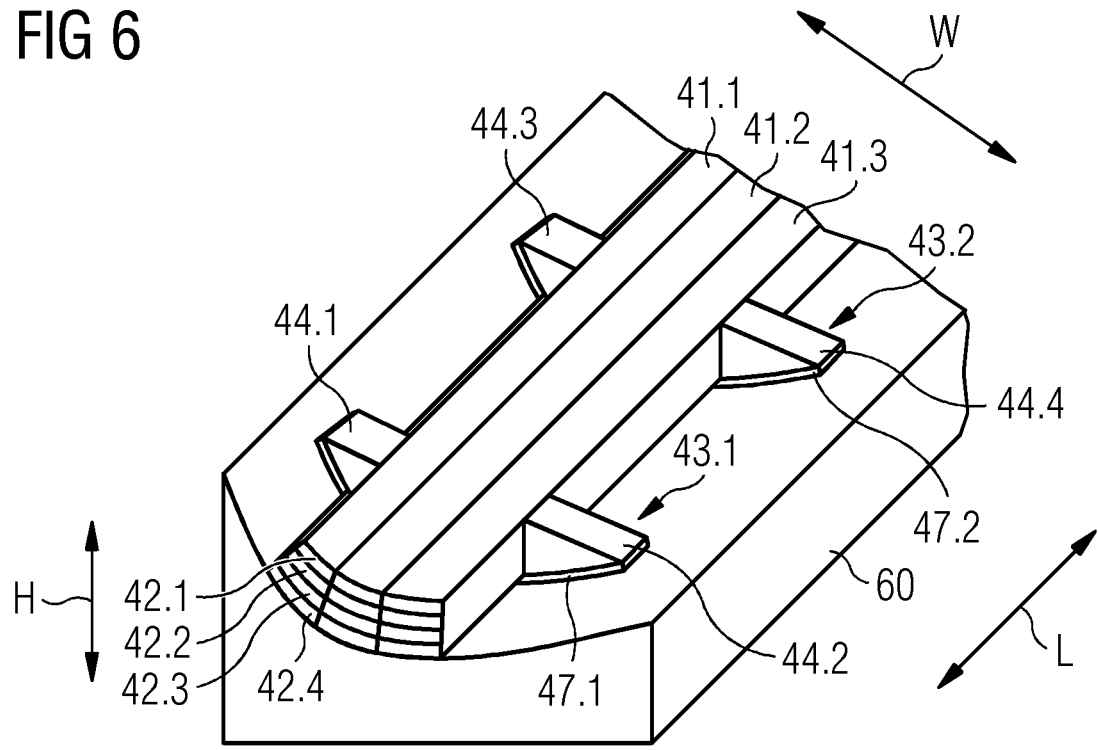
FIG. 6 shows a side perspective view on the spar cap of FIG. 5 on a spar cap mold.

FIG. 6 is a side perspective view on the spar cap 40 of FIG. 5 on a spar cap mold 60. The spar cap 40 is provided with two gap limiters 43.1, 43.2, which are arranged at a distance in the longitudinal direction L from one another. The distance may be in the range of 1 m to 30 m, in particular 3 m to 20 m, for example.

Cover mats 49 or other material may have been arranged on top of the spar cap mold prior to arranging the limit strip 47 on spar cap mold 60, i.e. so that the limit strip 47 is arranged on the cover mats 49 or other material. As can be seen, the spar cap mold 60 has a curvature. The curvature of the spar cap mold 60 extends in the height direction H along the width direction W. The curvature of the spar cap mold 60 corresponds to the curvature of the spar cap 40 and the wind turbine blade 10 at the position of the spar cap 40. Further to arranging the limit strip 47 on the spar cap mold 60, the first wedge element 44.1 and the second wedge element 44.2 are connected to the limit strip 47 by means of adhesives 48 (not shown). The three stacks 41.1, 41.2, 41.3 are thereafter arranged on the limit strip 47 and in between the first wedge element 44.1 and the second wedge element 44.2, so that the first wedge element 44.1 is arranged adjacent to the first outer stack 41.1 and the second wedge element 44.2 is arranged adjacent to the second outer stack 41.3, wherein the first outer stack 41.1 and the second outer stack 41.3 are of the three stacks 41.1, 41.2, 41.3 and are located opposite to one another in the width direction W. The spar cap 40 may thereafter be casted on the spar cap mold 60.

FIG. 7 is a front perspective view on a first example of a gap limiter 43 of the spar cap of FIGS. 5 and 6. Here, the limit strip 47 is made from precasted glass fiber-reinforced plastic and comprises multiple tunnels 51, of which the tunnels 51.1, 51.2, 51.3 are denominated.

FIG. 8 is a front perspective view on a second example of a gap limiter 43 of the spar cap of FIGS. 5 and 6. Here, the limit strip 47 is made from multiple precasted woven glass-fiber mesh fabrics laid on top of one another.

Although the present invention has been disclosed in the form of preferred embodiments and variations thereon, it will be understood that numerous additional modifications and variations could be made thereto without departing from the scope of the invention.

For the sake of clarity, it is to be understood that the use of 'a' or 'an' throughout this application does not exclude a plurality, and 'comprising' does not exclude other steps or elements.

The invention claimed is:

1. A spar cap for a wind turbine blade of a wind turbine, the spar cap comprising at least two stacks arranged in a longitudinal direction of the spar cap, wherein the at least two stacks are arranged adjacent to one another in a width direction of the spar cap and each of the at least two stacks comprises multiple elongate beams stacked on top of one another in a height direction of the spar cap, the height direction being transverse to the longitudinal direction and the width direction, wherein the spar cap further comprises a gap limiter comprising a first wedge element, a second wedge element and a limit strip, wherein the limit strip is a precasted layer material, wherein the first wedge element is arranged adjacent to a first outer stack and the second wedge element is arranged adjacent to a second outer stack, wherein the first outer stack and the second outer stack are of the at least two stacks and are located opposite to one another in the width direction, and wherein the first wedge element is connected to the second wedge element by the limit strip.

2. The spar cap according to claim 1, wherein the limit strip is preloaded by the at least two stacks, so that the first wedge element and the second wedge element are forced towards one another.

3. The spar cap according to claim 1, wherein the first wedge element and the second wedge element are arranged opposite to each other in the width direction.

4. The spar cap according to claim 1, wherein the limit strip is connected to at least one of a bottom side of the first wedge element and a bottom side of the second wedge element.

5. The spar cap according to claim 1, wherein the limit strip is connected to at least one of the first wedge element and the second wedge element by an adhesive.

6. The spar cap according to claim 1, wherein the limit strip is a flexible layer material.

7. The spar cap according to claim 1, wherein the limit strip is a glass layer material, made of at least one of a glass-fiber biax fabric and at least one glass-fiber mesh fabric.

8. The spar cap according to claim 1, wherein the limit strip comprises multiple tunnels, which can be flowed through by a resin.

9. The spar cap according to claim 1, wherein at least one longitudinal cut is arranged in at least one of the first wedge element and the second wedge element in or substantially in the longitudinal direction.

10. The spar cap according to claim 9, wherein at least one of the at least one longitudinal cut is a groove, the groove having a U-shape or V-shape.

11. The spar cap according to claim 1, wherein the spar cap comprises at least two gap limiters, which are arranged at a distance in the longitudinal direction from one another.

12. A wind turbine blade comprising a shell and a spar, the spar having at least one spar cap according to claim 1.

13. A wind turbine comprising at least one wind turbine blade according to claim 12.

14. A method for manufacturing a spar cap for a wind turbine blade of a wind turbine, the spar cap comprising at least two stacks arranged in a longitudinal direction of the spar cap, wherein the at least two stacks are arranged adjacent to one another in a width direction of the spar cap and each of the at least two stacks comprises multiple elongate beams stacked on top of one another in a height direction of the spar cap, the height direction being transverse to the longitudinal direction and the width direction, the spar cap further comprising a gap limiter comprising a first wedge element, a second wedge element and a limit strip, wherein the limit strip is a precasted layer material, the method comprising the steps of:
- (a) arranging the limit strip on a spar cap mold, the spar cap mold having a curvature,
- (b) connecting the first wedge element and the second wedge element to the limit strip, and
- (c) arranging the at least two stacks on the limit strip and in between the first wedge element and the second wedge element, so that the first wedge element is arranged adjacent to a first outer stack and the second wedge element is arranged adjacent to a second outer stack, wherein the first outer stack and the second outer stack are of the at least two stacks and are located opposite to one another in the width direction.

15. The method according to claim 14, wherein the spar cap is casted on top of the spar cap mold.

* * * * *